United States Patent [19]

Cacossa et al.

[11] Patent Number: 5,380,124
[45] Date of Patent: Jan. 10, 1995

[54] BEACH STABILIZER HAVING PILE GUIDES

[75] Inventors: Frank G. Cacossa; Kenneth F. Cacossa, both of Livingston, N.J.

[73] Assignee: Sand & Sea Corporation, Livingston, N.J.

[21] Appl. No.: 76,585

[22] Filed: Jun. 14, 1993

[51] Int. Cl.6 .......................... E02B 3/12; E02B 3/06
[52] U.S. Cl. ........................................ 405/16; 405/20; 405/30; 405/35
[58] Field of Search ................ 405/15, 16, 21, 25, 405/30, 33, 34, 35, 20

[56] References Cited

U.S. PATENT DOCUMENTS

| | | |
|---|---|---|
| 2,008,866 | 7/1935 | Hoffard . |
| 2,191,924 | 2/1940 | Humphrey .......................... 405/33 |
| 2,639,587 | 5/1953 | Hayden . |
| 2,731,799 | 1/1956 | Lange et al. ........................ 405/35 |
| 3,252,287 | 5/1966 | Bunko Suzuki . |
| 3,842,606 | 10/1974 | Stiles et al. . |
| 3,844,124 | 10/1974 | Tupper . |
| 4,172,680 | 10/1979 | Brown . |
| 4,297,052 | 10/1981 | Rankin . |
| 4,629,360 | 12/1986 | Cacossa et al. . |
| 5,178,489 | 1/1993 | Suhayda ............................. 405/21 |

FOREIGN PATENT DOCUMENTS 1328 of 1866 United Kingdom .
19284 of 1897 United Kingdom .

*Primary Examiner*—David H. Corbin
*Attorney, Agent, or Firm*—Lerner, David, Littenberg, Krumholz & Mentlik

[57] ABSTRACT

A beach stabilizer for minimizing erosion of sand and soil is disclosed. The device comprises a plurality of elements having first and second spaced apart surfaces on opposite sides of a center plane extending therethrough. The elements are interconnected to form at least one string and are arranged on a surface defined by the sand so that the center planes of adjacent elements are disposed in transverse relation to each other. At least one vertical pile is partially submerged in the sand and is associated with the at least one string so as to permit vertical adjustment while maintaining the location of the at least one string on the sand.

20 Claims, 6 Drawing Sheets

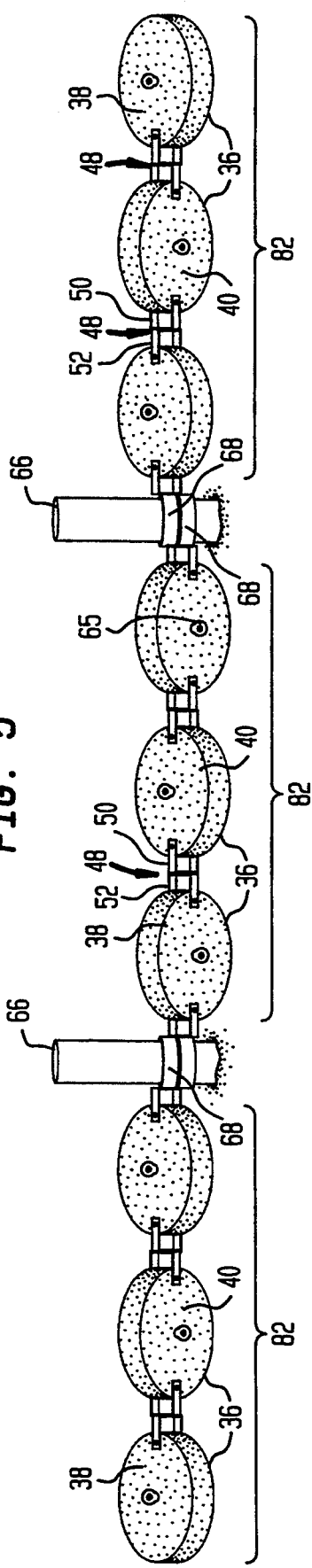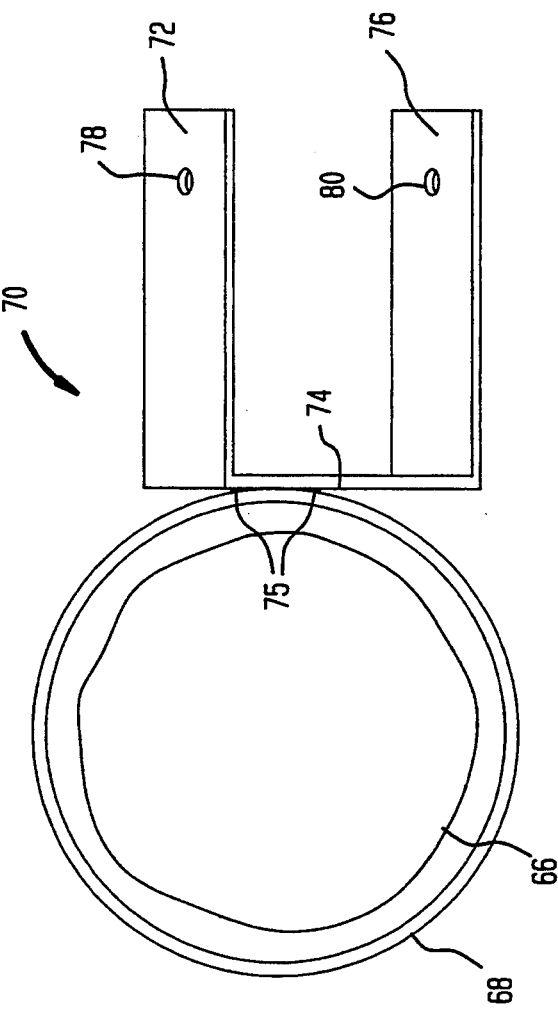
FIG. 5
FIG. 6

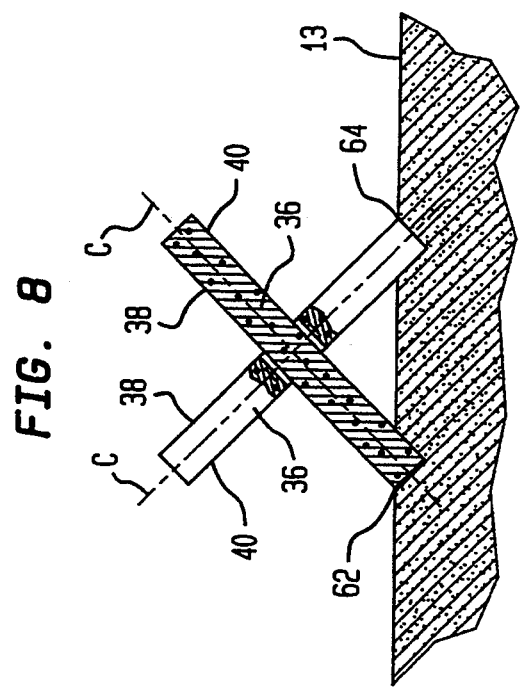
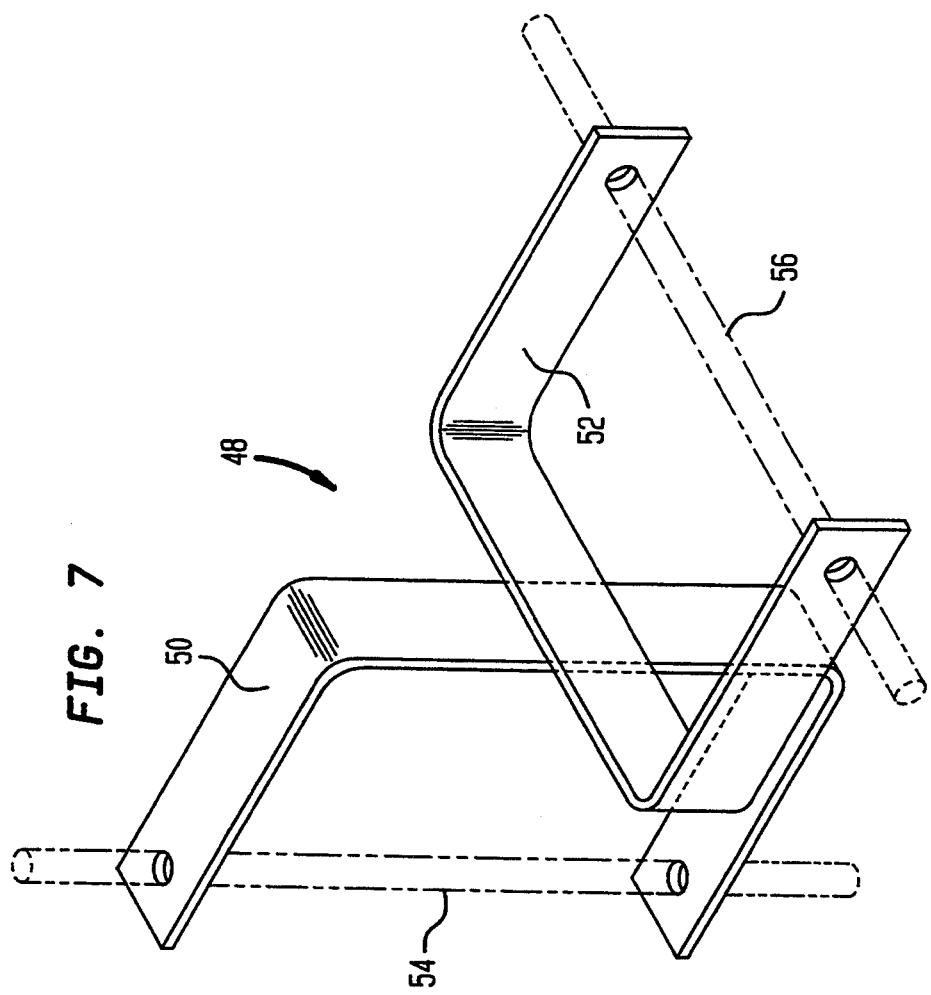

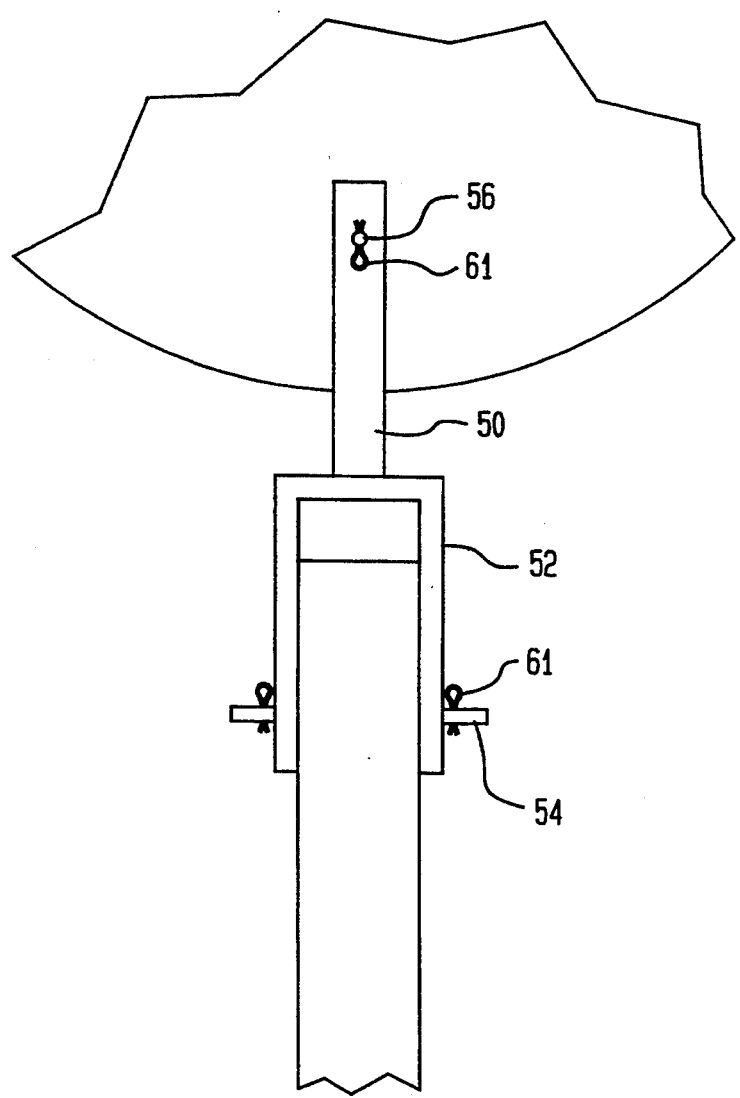

BEACH STABILIZER HAVING PILE GUIDES

FIELD OF THE INVENTION

The present invention relates to devices for preventing sand and soil erosion. More particularly, the present invention relates to a device for rebuilding eroded beaches and for minimizing erosion of the sand a beach.

BACKGROUND OF THE INVENTION

Devices for minimizing sand and soil erosion (hereinafter referred to as "sand" erosion) are widely used to minimize beach erosion caused by movement of water. The rate of sand erosion is greatly increased during storms which cause waves from the ocean to wash over sandy beach areas thereby producing run-offs which carry away substantial quantities of sand.

The prior art is replete with devices to minimize sand erosion on ocean fronting beaches. The crowded nature of the erosion prevention art is indicative of the great effort which has been expended to provide means which adequately protect sand on the beach from the effects of erosion. One solution which has been posed is to erect grass covered sand dunes parallel to the shorelines. However, this solution has proven to be unsatisfactory because the grass roots cannot grow deep enough to sufficiently protect the sand dunes. Thus, powerful waves produced during severe storms can sometimes undermine the roots and wash the sand dunes away.

Another solution taught by the prior art is to erect walls comprising a plurality of cement blocks. This solution is also unsatisfactory because the changing tides eventually overcome the cement block walls and cause them to sag. Once the sagging begins, the walls tend to fracture and break apart.

Still another solution disclosed in the prior art is to form a retaining wall by piling many large rocks on top of each other. The problem with this solution is that the rocks tend to be individually washed away or otherwise separated from the wall structure so that the individual rocks become buried in the surrounding sand.

Automobile tires have also been employed in prior art devices as a means for minimizing beach erosion. To this end, the tires are generally randomly tied together with rope or chains. When placed on a beach, the tires tend to lay flat so that waves caused by storms can easily wash over the tires and cause erosion to the associated beach. Thus, the tire devices are relatively ineffective.

In Applicants' own prior art beach stabilizer, disclosed in U.S. Pat. No. 4,629,360, a retaining wall system comprises a plurality of sand erosion inhibiting elements. Each of the elements comprises a body for interfering with the flow of water which would otherwise cause erosion of an associated beach. A link device connects a first element to a second element and includes a first means for pivotally securing the first element thereto for rotation about a first axis and second means for pivotally securing the second element thereto about a second axis nonparallel to the first axis. This device has proven to be quite effective in preventing beach erosion. However, it too has problems. In particular, during a severe storm, the great power of waves from the ocean can cause the beach stabilizer to move on the beach. Further, although this device permits the beach to "rebuild" as it becomes covered with sand over an extended period of time or after a severe storm, the device cannot easily be lifted back on to the surface of the beach. This is due to the length of the interconnected elements and the difficulty in finding the device. Once found, the device must be disassembled and moved by large equipment back to an appropriate location on the beach.

The present invention solves all of the aforementioned problems and particularly improves upon Applicants' own prior art device disclosed in U.S. Pat. No. 4,629,360 by providing means for retaining such a device in a desired location and for marking such location; thus, permitting the device to be easily lifted as it builds sand layers on an associated beach.

SUMMARY AND OBJECTS OF THE INVENTION

One aspect of the present invention pertains to a beach stabilizer for building layers of sand on a beach and for minimizing erosion of the beach. The beach stabilizer comprises a plurality of elements having first and second spaced apart surfaces on opposite sides of a center plane extending therethrough. Element connector means are provided for connecting the plurality of elements to form at least one string. The at least one string is then arranged on a surface defined by the sand of a beach so that the center planes of adjacent elements are disposed transversely with respect to each other. The adjacent elements are arranged so that alternating obtuse and acute angles are formed with respect to the surface of the sand. The beach stabilizer also comprises pile means having a vertical axis therethrough and extending partially above the surface of the sand and being partially submerged within the sand. Securing means associated with the at least one string and the pile means are provided for preventing movement of the associated string in at least one direction substantially parallel with the surface of the sand. At the same time, slidable movement is permitted in a direction defined by the vertical axis of the pile means.

In one preferred embodiment, the element connector means comprises a plurality of link devices each including a first member pivotally secured to a respective one of the elements, and a second mender pivotally secured to an adjacent one of the elements. In this preferred embodiment, associated ones of the first and second members of each of the link devices are secured together.

In another preferred embodiment, the securing means of the beach stabilizer comprises at least one collar and collar connection means for connecting the at least one collar to the at least one string. The collar is arranged around the pile means so that it permits vertical slidability of an associated one of the strings with respect to the pile means.

In yet another preferred embodiment, the pile means comprises a plurality of vertically oriented piles arranged at predetermined positions along the at least one string. In this particularly preferred embodiment, the at least one collar comprises a plurality of collars, each of which is arranged around a corresponding one of the plurality of vertically oriented piles.

It is preferable for the plurality of elements to comprise a plurality of discs having opposing substantially planar surfaces. Furthermore, each of the elements may be made of concrete and are preferably of a solid construction.

it is also preferable for the plurality of discs to include lifting pins extending from at least one of the planar surfaces thereon. The lifting pins are preferably anchored within the plurality of discs and may include an arcuate portion, such as an eyelet, arranged adjacent to the at least one planar surface from which it extends.

In still another preferred embodiment, the plurality of vertically oriented piles are made of wood and are driven to a substantial depth within the sand of a beach to assure that it is not likely to be removed from said sand by the waves associated with a rising tide during a storm.

In yet another preferred embodiment, the at least one string comprises a plurality of strings and can be arranged in parallel relation to each other or can be arranged to intersect each other at right angles or acute or obtuse angles.

In another aspect of the present invention, a method of assembling a beach stabilizer on a beach is disclosed. The method preferably comprises the steps of placing the erosion prevention means on a surface defined by the sand of a beach. Providing at least one pile means having a vertical axis therethrough and placing the at least one pile means within the sand so that it is partially submerged therein and partially extends above the surface thereof. At least one collar is arranged around a respective one of the at least one pile means and the collar is connected to the erosion prevention means so that the erosion prevention means is prevented from moving in at least one direction substantially parallel with the surface of the sand, but is permitted to slide in a direction defined by the vertical axis of the pile means.

According to this aspect of the present invention, the step of placing at least one pile means in the sand comprises the steps of aligning the at least one pile means with the at least one collar so that the pile means extends upwardly from the surface of the sand through the at least one collar. A pressurized stream of water may then be pumped into the sand along side of the at least one pile means and a downwardly directed force may then be exerted on the at least one pile means so that it is inserted to a desired depth into the sand.

In another embodiment, the step of placing the at least one pile means in the sand may comprise the step of driving the pile means into the sand until it is arranged at its desired depth.

In another preferred embodiment, the step of placing the at least one pile means in the sand comprises the steps of digging at least one hole in the sand sufficient to retain the at least one pile means therein and to permit the at least one pile means to extend above an uppermost surface of the sand. The pile means are then placed within a corresponding hole and are secured therein.

It is also preferable to arrange the at least one string on the surface defined by the sand so that the center planes of adjacent elements are disposed transversely with respect to each other and form alternating obtuse and acute angles with respect to the surface of the sand.

Accordingly, it is an object of the present invention to provide a beach stabilizer comprising a plurality of elements which are slidably related to a pile means in the vertical direction, but which are generally fixed with respect to the pile means in a direction defined by the surface of the sand.

It is another object of the present invention to provide a beach stabilizer comprising a plurality of piles which mark the location thereof on the sand on which it is placed.

It is another object of the present invention to provide a beach stabilizer being vertically adjustable but generally fixed in a transverse direction defined by the surface of sand on which it is placed.

BRIEF DESCRIPTION OF THE DRAWINGS

The above summary, as well as further objects, features, and advantages of the present invention will be more fully understood with reference to the following detailed description of a beach stabilizer, when taken in conjunction with the accompanying drawings wherein.

Figure 3:
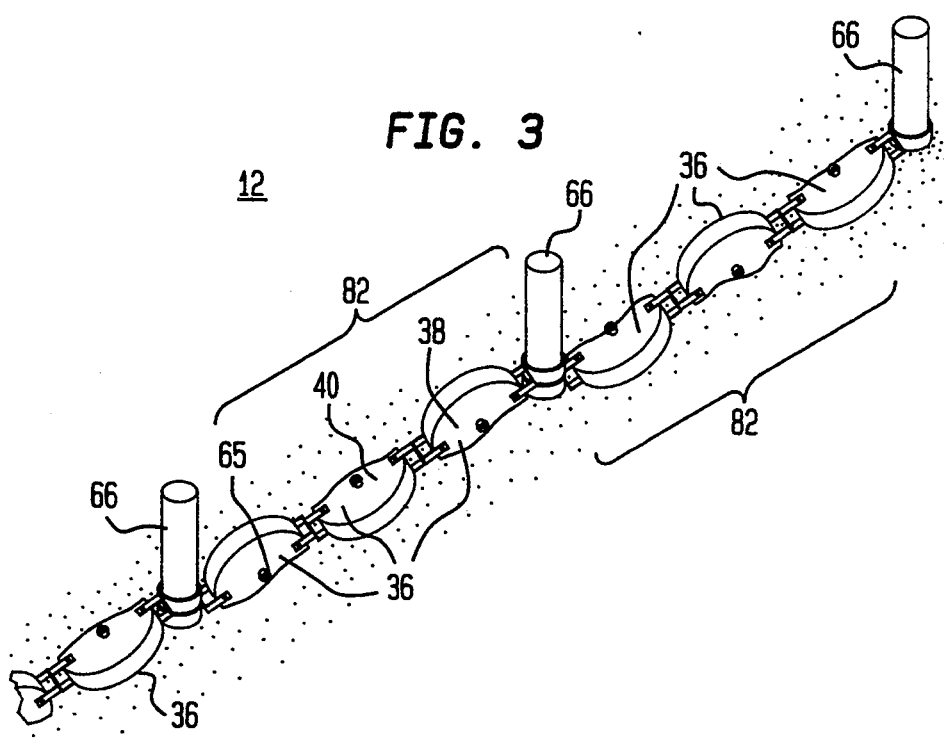
FIG. 3 is a front perspective view of a portion of the embodiment shown in FIG. 1 illustrating the relationship between the piles and the erosion preventing discs of the present invention.

PIG. 5 is an isolated front view of the portion of the embodiment shown in FIG. 3.

Figure 4:
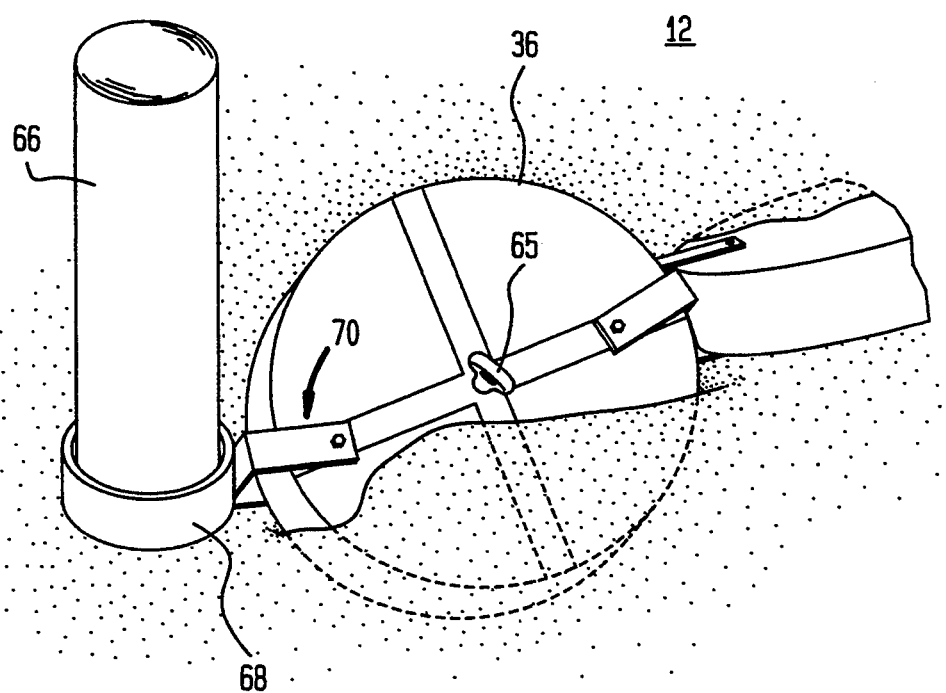
FIG. 4 is a front perspective view of a portion of the embodiment shown in FIG. 3 illustrating the slidable connection between the erosion preventing discs and the piles of the present invention.

FIG. 6 is a fragmented top plan view of a partially unassembled portion of a pile and connecting yoke from the embodiment shown in FIG. 4.

Figure 1:
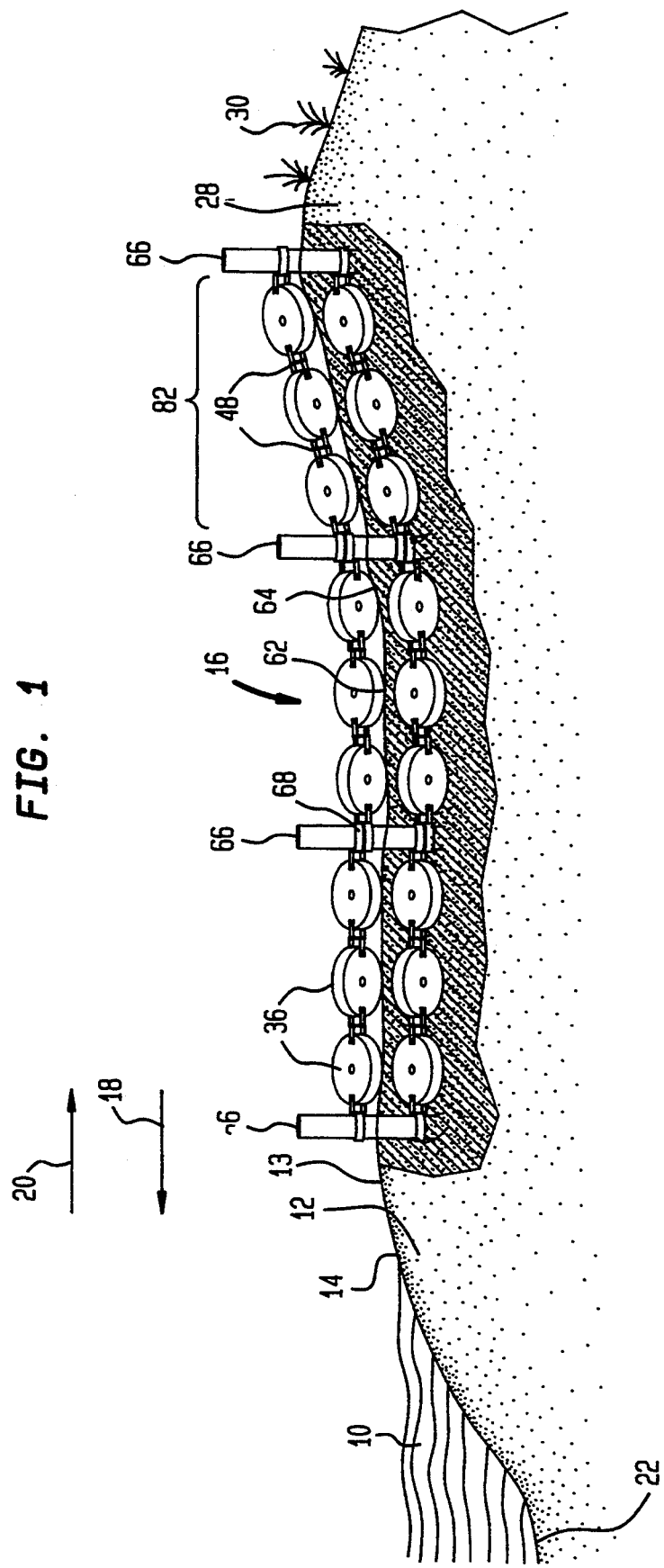
FIG. 1 is a side elevational partially sectional view of an embodiment of the present invention arranged on a beach.
Figure 2:
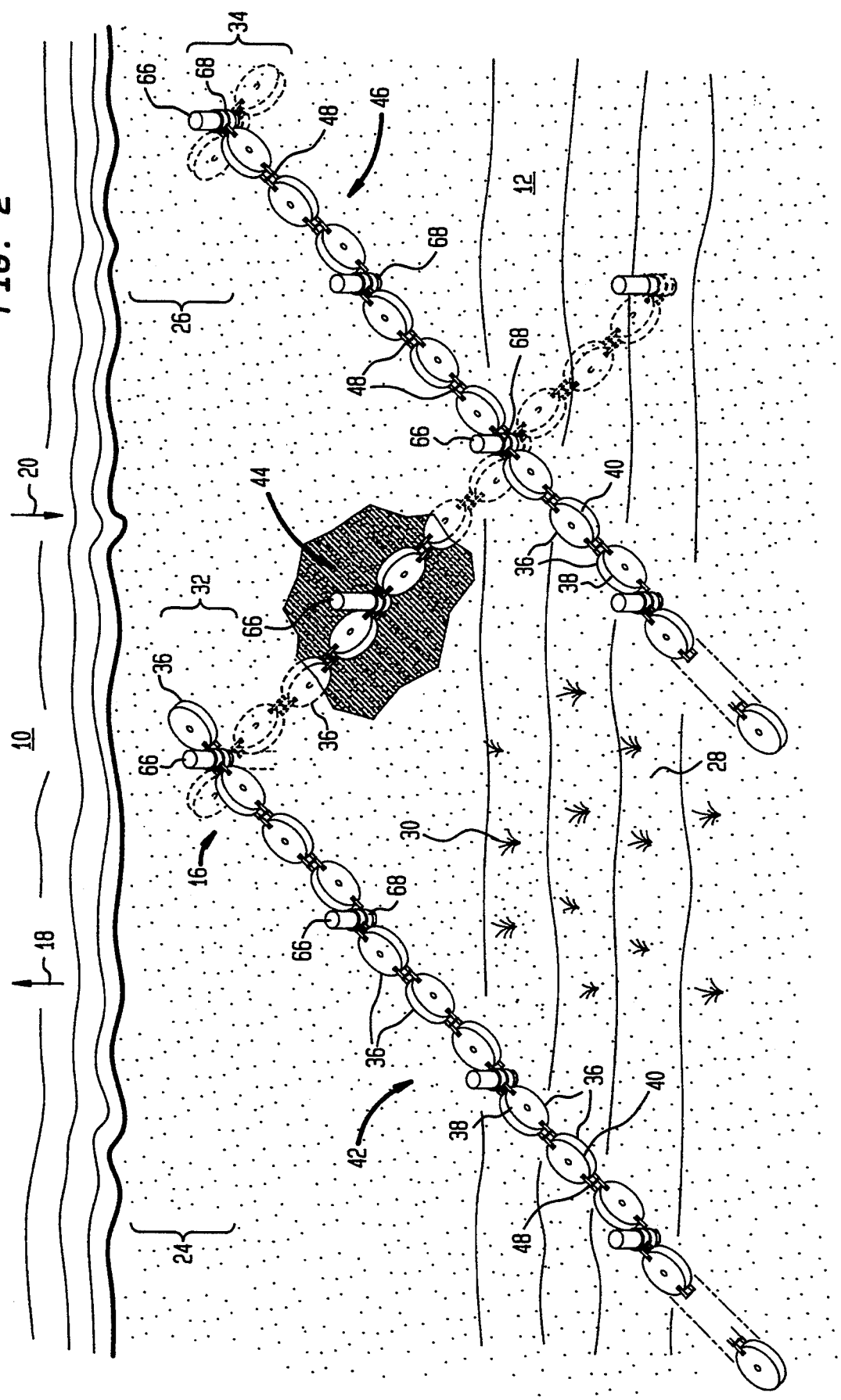
FIG. 2 is a plan view partially in section of the embodiment shown in FIG. 1.

FIG. 7 is an isometric view of a connecting link assembly used in the embodiment of FIGS. 1 and 2.

FIG. 8 is an end sectional elevational view of the embodiment shown in FIG. 2.

FIG. 9 is an elevational view of the connecting link assembly employed in the embodiment of FIGS. 1 and 2.

DETAILED DESCRIPTION OF THE PREFERRED EMBODIMENTS

In accordance with one preferred embodiment of the present invention, a beach stabilizer generally designated 16 is clearly disclosed in FIGS. 1-3. As the beach stabilizer 16 of the present invention is an improvement over the retaining wall system of U.S. Pat. No. 4,629,360, the text of that patent is incorporated by reference herein. It should be appreciated that although the beach stabilizer 16 will be described herein as a device for building layers of sand on a beach 12 and for preventing sand erosion on the beach 12 facing an ocean 10, it can also be used to prevent erosion of any plot of soil which abuts a body of water such as a river, lake, etc.

In FIGS. 1 and 2, a body of water 10 which, for example, may be an ocean, abuts a sand filled beach 12 having a shore line 14. The beach stabilizer 16 is placed on the surface 13 of the beach 12. The beach stabilizer 16 not only minimizes sand erosion along a direction 18 into the ocean 10, it also actually builds up the sand on the beach 12 by trapping sand in a manner discussed below. It is known that many storms originate over the ocean, and tend to create waves in the ocean 10 which wash over the beach 12 along a direction 20 generally perpendicular to the shore line 14. The waves are often tremendously powerful and after constantly pounding the beach 12, tend to erode away sand along direction 18. Sand erosion is particularly caused !by a backflow of strong currents along direction 18 after the waves have crashed into the beach 12. These currents tend to carry the sand of the beach 12 into the ocean 10 and deposit the sand on the bottom 22 thereof. The erosion caused by the waves crashing into the beach 12 is usually random and non-uniform and may be quite significant. Thus, one portion of the beach 12, for example, at 24 shown in FIG. 2, may encounter greater erosion than an adjacent portion, for example, at 26.

A beach stabilizer 16 is adapted to easily follow the contour of the terrain upon which it is laid. For example, as shown in FIG. 1, the beach 12 may include a dune 28 which is a hill of sand ranging four or more feet in height that is generally parallel to the shore line 14. The dune 28 comprises a crest which is covered with grass 30 as best appreciated from FIG. 1. As will be discussed further below, the beach stabilizer 16 is constructed to lay on the surface 13 of the beach 12 and will follow the uneven surface contour formed by the dune 28. Further, the beach stabilizer 16 is sufficiently flexible so that the end portions 32 and 34, closest to the shore line 14, are adapted to change with the shoreline as it "sinks" due to the tremendous power of back-flow current in the direction 18 at the vicinity shoreline 14. This is particularly important because the shoreline 14 tends to erode more quickly than other portions of the beach 12 and the end portions 32 and 34 will usually receive the most frequent and harmful exposure to the back-flow currents. This will become clearer after referring to the description regarding the structure of the beach stabilizer 16 as explained in more detail below.

As shown in FIGS. 1–5, the beach stabilizer 16 includes a plurality of elements 36. Although the elements are shown as solid discs having two opposing planar surfaces 38 and 40 with respect to a center plane C (FIG. 8), it should be appreciated that the elements 36 may comprise various structural shapes and sizes. For example, the element 36 may have a bulbous shape or may be square.

In the preferred embodiment of the present invention, the elements 36 (hereinafter referred to as "discs") are made of concrete, however, they may be made of various materials such as wood, metal, stone, rubber, etc. While the discs 36 are shown solid, they may also be hollow as are automobile tires. In FIGS. 1–3 and 5, the beach stabilizer 16 is shown with the discs 36 interconnected to form at least one string 42–46. The number of strings shown are by way of example and therefore, in practice, more or fewer strings may be employed depending upon the extent of the area to be protected.

Each of the adjacent discs 36 are interconnected by corresponding links 48. Although the specific structure of the links 48 may vary in practice, as shown in FIGS. 7 and 9, each of the links 48 comprise a pair of rigid members 50 and 52 which are secured to adjacent discs 36 by a pair of pins 54 and 56. The pins are adapted to extend through a pair of corresponding aligned apertures (not shown) in the planar surfaces 38 and 40 of the discs 36. The pins 54 and 56 can then be secured into assembled position through the rigid members 50 and 52 and the discs 36 by cotter pins 61, as best appreciated from FIG. 9. A more detailed discussion of the means for interconnecting the discs 36 is specifically set forth at column 3, line 53 through column 4, line 60 of U.S. Pat. No. 4,629,360. This text is expressly incorporated by reference herein.

In the preferred embodiment shown in FIGS. 1–9, the size and shape of each of the discs 36 are substantially identical. However, in alternate embodiments, the discs 36 may comprise various sizes and shapes all remaining within the scope of the present invention. Similarly, although the strings 42–46 shown in FIG. 2 are substantially the same length, in alternate embodiments they may be different lengths.

The discs 36 may be formed in a mold of a desired shape. Each of the discs 36 are provided with one lifting pin 65 which is arranged at a central area and extends perpendicular to the center plane C. The lifting pins 65 may comprise a steel shank having an eyelet arranged adjacent planar surface 38. The eyelet is adapted to be engaged by a lifting hook of external assembly equipment, such as a bull-dozer. As the lifting pin 65 is used for carrying sections of the beach stabilizer 16 when it is to be assembled on a beach it is important for it to be firmly secured therein so that it can support the entire weight of the corresponding disc 36 during such lifting and assembly operations. The apertures may be formed by placing tubular material within the disc mold during molding of same. The apertures are preferably parallel and may be spaced equally from the outer edges of the discs 36. The generally planar surfaces 38 and 40 are preferably parallel to each other and thus, define a certain disc thickness, which may be 8 inches, for example. In a preferred embodiment, the discs have a diameter of about 48 inches and when made of concrete, they weigh about 700 pounds. This weight is sufficiently heavy to resist most of the expected water currents to which the discs 36 will be subjected.

As best shown in FIGS. 2–5, adjacent ones of the discs 36 are coupled together so that their center planes C are non-parallel and thus intersect each other. The intersecting planes are preferably at right angles to each other. However, the precise angle of intersection may vary and is determined by the orientation of the pins 54 and 56 of the links 48. Accordingly, every other one of the center planes C of the discs 36 are preferably parallel to each other. However, the relative relationship of the discs 36 may change somewhat as one or more of these discs 36 settle in response to sand erosion beneath the beach stabilizer 16 or a portion of it. As discussed above and further below, the discs 36 of strings 42–46 are set on edge such that the lower edges 62 and 64 rest on the surface 13 of the beach 12. The discs 36, which may become buried as shown in FIGS. 1 and 2, are oriented similarly to the discs 36 which sit on the surface 13 of the beach 12. As the static and dynamic arrangement between adjacent discs have been described in greater detail at column 5, line 8 through column 7, line 16 in U.S. Pat. No. 4,629,360, that text is expressly incorporated by reference herein.

It is important to understand that the alternating angles formed between the center planes C with respect to the surface 13 of the beach 12, effectively break up waves which are washed upon the beach 12 and substantially impede the flow of the back-flow currents from the beach 12 in direction 18 toward the ocean 10. In fact, extensive scientific tests performed at laboratories of Stevens Institute of Technology demonstrate that the beach stabilizer 16 reduces the "energy" of the flow of water, which it encounters, by about twenty-eight percent. Thus, erosion of the beach 12 is substantially minimized by arranging adjacent ones of the discs 36 in this alternating manner.

Furthermore, by slowing the flow of water over the strings 42–46 sand, which is suspended in the water, is dropped both in front and in back of the individual discs 36. Thus, in building-up the beach 16, the strings 42–46 tend to become buried over time. This aspect of the beach stabilizer 16 is also present in the retaining wall system of U.S. Pat. No. 4,629,360, which is also quite effective under normal conditions. However, when the strings of discs disclosed therein should become entirely buried, a problem arises because it is difficult to lift the strings back to the surface of the sand. Additionally, despite the great weight of the wall retaining system disclosed in U.S. Pat. No. 4,629,360, powerful tides may sometimes move the strings to undesirable locations which are not ideal for preventing erosion to an associated beach and which makes the strings difficult to locate. These problems are overcome by the use of pile means and securing means which permit vertical adjustment and fixing of associated sections 82 of the strings 42-46 of the present invention.

More particularly, a plurality of vertically oriented piles 66 are connected to the strings 42-46 at predetermined positions there along. As shown in FIGS. 1-3 and 5, the piles 66 may be connected to sections 82 of the strings 42-46 so that every third disc 36 is separated from an adjacent disc 36. In alternate embodiments, the sections 82 may comprise more or less than three discs 36. Each of the sections 82 include securing means such as a pair of collars 68 associated therewith. The collars 68 are preferably arranged at opposite ends of the sections 82 to secure the sections 82 to associated piles 66 and to permit vertical adjustment of the sections 82 along a vertical axis of the piles 66. This is an important feature of the present invention as it provides the beach stabilizer 16 with various advantages over prior art devices.

As shown in FIGS. 1-3 and 5, each of the sections 82 are arranged so that both of its corresponding collars 68 are slidably mounted over a corresponding pile 66. Adjacent sections 82 are arranged so that their respective collars 68 are mounted one beneath the other along the vertical axis of a corresponding pile 66. The sections 82 are preferably arranged so that they can be lifted from their respective string 42-46 along the vertical axes of the piles 66 by engaging a lifting mechanism (not shown), such as a bulldozer with appropriately sized hooks and chains, with the lifting pins 65. In the preferred embodiment shown in FIG. 5, both of the collars 68 of the center section 82 are arranged around respective piles 66 so that the collars 68 of adjacent sections 82 are placed directly above the collars 68 of the center section 82. This arrangement permits a common horizontal axis to extend between the collars 68 and through the center of the discs 36. When it is desirable to lift the center sections 82 from the beach 12, both of the adjacent sections 82 would have to be removed before the center section can be lifted.

In an alternate embodiment, the sections 82 can be arranged so that when one of the sections 82 is lifted from its assembled position on the surface 13 of the beach 12, at least one of the adjacent sections 82 will then also be free to adjust upwardly along the vertical axes of the piles 66. As discussed further below, the structure of the separable sections 82 with respect to the strings 42-46 and their adjustability with respect to the piles 66 greatly aids in the gradual build-up of layers of sand on an associated beach.

In a preferred embodiment, the piles 66 are constructed of wood and have a diameter of between about 4 inches and about 18 inches. However, most preferably, the diameter of the piles 66 is about ten inches although, as can be appreciated, the diameter of the pile 66 may vary outside of the recited ranges in alternate embodiments of the present invention. When the piles 66 selected are of the type having ten inch diameters, corresponding collars 68, having a diameter of greater than ten inches, are arranged around the piles 66 to facilitate the connection of discs 36 thereto. By placing the collars 68 of the sections 82 around piles 66, the sections 82 are effectively interconnected to form the strings 42-46. This interconnected structure is an important improvement of the present invention which, among other things, permits the sections 82 to be independently lifted from an associated string 42-46 along the vertical axes of the piles 66. As can be appreciated, this feature of the present invention did not exist in the prior art, such as applicant's own wall retaining system of U.S. Pat. No. 4,629,360, because all of the discs were connected by link members and thus it was not possible to vertically adjust the strings of discs without first breaking the engagement between interconnected link members.

Corresponding U-shaped yokes 70 are used to connect the discs 36 to the collars 68. The yokes 70 are substantially identical to the rigid members 50 and 52 of the links 48. However, they have been provided with a separate reference number for ease of description. The yoke 70 and the collar 68 are preferably made of a rigid metal material such as stainless steel or cast iron so that the connections between the discs 36 and the collars 68 are strong enough to withstand the tremendous forces exerted thereon by the waves and back-flow currents of the ocean water.

As best shown in FIGS. 4 and 6, each of the C-shaped yokes 70 have an upper section 72, a center section 74 and a lower section 76. The center section 74 is preferably permanently secured to the corresponding collar 68 by a conventional means such as a weld 75. However, in alternate embodiments the center section 74 may be removably secured to the collar 68 by a nut and bolt arrangement or other known securing means. The upper and lower sections 72 and 76 have corresponding apertures 78 and 80 therethrough to receive mounting hardware therein. The mounting hardware may comprise a rod-like device such as the pins 54 and 56 used to secure adjacent discs 36 to each other. The pins, or other mounting hardware, associated with upper aperture 78 and lower aperture 80 extend through the aligned apertures in the planar surfaces 38 and 40 of the discs 36 as discussed below and in U.S. Pat. No. 4,629,360 for connection of the links to the discs.

In operation, the beach stabilizer 16 is placed on the surface 13 of a beach 12 as discussed above and shown in FIGS. 1-4. The plurality of piles 66 have the appearance of wood columns, commonly used to support piers, and thus do not take away from the generally pleasing aesthetic appearance of the beach 12. The piles 66 are arranged to extend partially beneath the surface 13 of the sand and partially above the surface 13 for purposes that will become more apparent in light of the discussion below. Although the length of the piles 66 is not critical, the piles 66 are preferably approximately sixteen feet in length. In a preferred embodiment, approximately ten feet extend beneath the surface 13 of the sand and approximately six feet extend above the surface 13. Of course, these distances may vary dependent upon the specific terrain in which the beach stabilizer 16 will be used. In this regard, if the beach stabilizer 16 is to be used on a beach that is subject to rough waves and particularly high tides, the piles 66 would need to extend beneath the surface 13 of the sand to a greater extent than they would if the beach was only subjected to docile waves with minimal back-flow current. It is, however, important to assure that the piles 66 are secured beneath the surface 13 of the sand to a sufficient extent so that they will remain steadfast when subjected to the great forces exerted by waves and back-flow currents.

Since the collars 68 have a larger diameter than the corresponding piles 66, the strings 42–46 remain vertically slideable with respect to the piles 66. However, it should be apparent that movement of the strings 42–46 is greatly restricted with respect to directions defined by the surface 13 of the beach 12. In this regard, the actual degree of movement of the strings 42–46 is limited to the approximate 2 inch size differential between the outer diameter of the piles 66 and the inner diameter of the corresponding collars 68. Thus, the piles 66 serve to retain the strings 42–46 in their desired locations on the beach 12. As discussed above, despite the great weight of the strings 42–46, the retaining wall system disclosed in U.S. Pat. No. 4,629,360 can sometimes be entirely displaced to undesired locations when subjected to extremely large amounts of force, such as those forces which are exerted upon the beaches during hurricanes and other severe storms.

When high tides reach the location of the beach stabilizer 16 on the beach 12, the flow of water will be retarded by each of the individual discs 36 in both direction 20, toward the beach, and direction 18, toward the ocean. As discussed above, the kinetic energy of the flowing water is reduced by about 28%. This retardation of the water flow causes the sand to drop around the area of the discs 36 until the discs 36 are entirely or substantially covered with sand. A further advantage of the piles 66 is evident under the circumstances. That is, in addition to the retention and adjustability functions, the piles 66 serve to mark the location of the elements 82 of the strings 42–46 so that they can easily be found and lifted after they have been buried beneath trapped sand. Since it is advantageous to increase the sand content of the beach and thus rebuild an eroded beach, it is advantageous to lift the covered sections 82 so that they are again placed on the surface 13 of the beach 12 before they are subjected to the waves and back-flow currents of a severe storm which may wash the sand away from the discs 36 and back into the ocean 10. However, if the sections 82 are not lifted before this happens, the associated area on the beach will again be rejuvenated by sand sediment which will be trapped by the sections 82 through the normal flow of water over the discs 36.

As discussed above, as the sections 82 are lifted along the vertical axis of the piles 66, the sand height is increased by layers deposited on the beach 12. This buildup of the sand on the beach 12 may cause the piles 66 to become buried over time. Accordingly, as the surface 13 of the beach 12 creeps up along the piles 66, it becomes desirable to lift the piles 66 before they become entirely buried beneath the sand. This can be easily accomplished through the use of heavy machinery (not shown). The piles 66 can therefore be adjusted an infinite number of times so that layers of sand can continuously be deposited on the beach 12 until the beach has been built-up to a desired height.

By arranging the sections 82 for vertical adjustability on the piles 66, the sections 82 and thus, the entire associated strings 42–46, may be relocated and repositioned if desired, an unlimited number of times with no detrimental affect on their ability to function. Advantageously, the sections 82 can be moved without any disassembly operations with regard to the interconnected discs 36.

As seen in FIG. 2, the strings 42–46 are generally arranged in straight lines and are disposed to intersect each other at angles of about 90°. However, in alternate embodiments, strings 42–46 may be arranged to form various configurations. This is possible due to the pivot point between the piles 66 and the collars 68 which permits sections 82 (FIGS. 3 and 5) to be placed on the surface 13 of the beach 12 at various angles with respect to an adjacent section 82. Thus, the structure and operation of the piles 66 and the respective collars 68 permits the sections 82 to instantaneously change the direction of a string of discs 36 on the beach 12.

When assembling the beach stabilizer 16 on the beach 12, sections 82 of the strings 42–46, each such section 82 preferably consisting of 3 discs 36, are placed at a desired location on a beach 12. As discussed above, the sections 82 may be carried to the desired location by using a bulldozer or other lifting device sufficient to lift the sections 82 by the lifting pins 65.

Adjacent sections 82 are arranged on the surface 13 of the beach 12 so that the center points of their respective collars 68 are placed in horizontal alignment with the collars 68 arranged one above the other. The piles 66 are then placed through the aligned collars 68 so that they extend upwardly from the surface 13 of the beach 12. The piles 66 are then driven beneath the surface 13 of the beach 12 to a sufficient depth, such as ten feet, so as to withstand the expected forces to be exerted thereon. Preferably, the step of driving the pile 66 beneath the surface 13 of the beach 12 is performed by placing a pipe in the sand along side of a pile 66. Water is then pumped at high pressure through the pipe and into the sand so that the associated pile 66 can be "jetted" into the sand. Typically, this is accomplished by placing a portion of the weight of an associated front end loader of a bulldozer on the pile during the pumping process. The downward force of the weight of the front end loader easily drives the pile 66 into a steadfast position within the sand of a beach 12. Alternatively, the pile 66 maybe driven into the sand by means of a pile driver or by digging a hole and placing the pile 66 therein after it has been placed through the aligned collars 68.

The foregoing method of assembly should be duplicated for each of the sections 82 and the associated piles 66. When assembling the beach stabilizer in this manner, it is important to assure that the lower edges 62 and 64 of the discs 36 are placed on the surface 13 of the sand so that the planar surfaces 38 and 40 of adjacent discs 36 form alternating acute and obtuse angles with respect to the surface 13, all of which is shown in FIG. 8 and discussed above.

By assembling the various components of the beach stabilizer 16 in this manner, it can be installed over various types of terrain that are subject erosion without risking deterioration or cracking of the beach stabilizer 16. Further, the relationship between the piles 66 and the sections 82 will assure that additional layers of sand can be built-up and that the location of the strings 42–46 can always be determined even when they are buried over time or after a severe storm. The piles 66 will also assure that the beach stabilizer 16 will not be moved to undesirable locations when unexpectedly large forces are exerted thereon.

While the foregoing description and figures are directed toward the preferred embodiments accordance with the present invention, it should be appreciated that numerous modifications can be made to each of the components of the beach stabilizer 16 and the method of assembling same. Indeed, such modifications are encouraged to be made in the materials, structure, arrangement and steps of the disclosed embodiments and methods of the present invention without departing from the spirit and scope of the same. Thus, the foregoing description of the preferred embodiments should be taken by way of illustration rather than by way of limitation with respect to the present invention as defined by the claims set forth below.

We claim

1. A beach stabilizer for building layers of sand and minimizing erosion of a beach comprising:
   a plurality of elements having first and second spaced apart surfaces relative to a center plane therethrough;
   element connector means for connecting said plurality of elements to form at least one string of said elements, said at least one string comprising a plurality of sections, adjacent ones of said plurality of sections being flexible with respect to each other, said at least one string being arranged on a surface defined by said sand so that said center planes of adjacent ones of said elements are disposed transversely relative to each other, said adjacent ones of said elements being further arranged to form alternating obtuse and acute angles with respect to said surface;
   pile means having a vertical axis therethrough and extending partially above said surface and being partially submerged within said sand; and
   securing means associated with said at least one string and said pile means for preventing movement of said plurality of sections of said at least one string with respect to said pile means in at least one direction substantially parallel with said surface of said sand, but permitting independent slideable movement of said plurality of sections in a direction defined by said vertical axis of said pile means.

2. The beach stabilizer of claim 1 wherein said element connector means comprises a plurality of link devices each including a first link member pivotally secured to one of said elements, and a second link member pivotally secured to an adjacent one of said elements, associated ones of said first and second link members being secured together.

3. The beach stabilizer of claim 1 wherein said securing means comprises at least one collar, and including collar connection means for connecting said at least one collar to said at least one string, said at least one collar being arranged around said pile means.

4. The beach stabilizer of claim 3 wherein said pile means comprises a plurality of vertically oriented piles arranged at predetermined positions along said at least one string, said at least one collar comprising a plurality of collars, each of said plurality of collars being arranged around a respective one of said plurality of vertically oriented piles.

5. The beach stabilizer of claim 1, wherein said plurality of elements are substantially planar.

6. The beach stabilizer of claim 1, wherein said plurality of elements are substantially disc shaped.

7. The beach stabilizer of claim 1, wherein said plurality of elements are made of concrete.

8. The beach stabilizer of claim 1, wherein said plurality of elements are solid.

9. The beach stabilizer of claim 1, wherein said pile means are made of wood.

10. The beach stabilizer of claim 1, wherein said at least one string comprises a plurality of strings.

11. The beach stabilizer of claim 10, wherein at least two of said plurality of strings are arranged in a parallel relationship to each other.

12. The beach stabilizer of claim 10, wherein at least two of said plurality of strings are arranged to intersect each other.

13. The beach stabilizer of claim 1, wherein said plurality of elements comprise lifting means for facilitating transporting of said plurality of elements.

14. The beach stabilizer of claim 13 wherein said lifting means comprise a plurality of lifting pins, said lifting pins having an anchoring portion secured within a corresponding one of said plurality of elements and an arcuate portion arranged adjacent at least one of said first and second spaced apart surfaces.

15. A method of assembling a beach stabilizer on a beach comprising the steps of:
   placing erosion prevention means on a surface defined by the sand of said beach, said erosion prevention means comprising a plurality of elements having first and second spaced apart surfaces relative to a center plane therethrough;
   connecting said plurality of elements to form at least one string comprising a plurality of sections, adjacent one of said plurality of sections being flexible with respect to each other;
   providing at least one pile means having a vertical axis therethrough and placing said at least one pile means within said sand so that it is partially submerged therein and partially extends above the surface thereof;
   providing securing means for operatively connecting said at least one pile means to said plurality of sections of said erosion prevention means so that said plurality of sections are prevented from moving in at least one direction substantially parallel with said surface of said sand, but permitting independent slideable movement of said plurality of sections in a direction defined by said vertical axis of said pile means.

16. The method of claim 15 wherein said securing means comprises at least one collar, and said placing of said at least one pile means in said sand comprises the steps of:
   aligning said at least one pile means with said at least one collar so that said at least one pile means extends upwardly from the surface of said sand through said at least one collar;
   pumping a pressurized stream of water into said sand alongside said at least one pile means; and
   exerting a downwardly directed force on said at least one pile means so that said at least one pile means is inserted to a desired depth into said sand.

17. The method of claim 15 wherein said securing means comprises at least one collar, and said placing of said at least one pile means in said sand comprises the steps of:
   aligning said at least one pile means with said at least one collar so that said at least one pile means extends upwardly from the surface of said sand through said at least one collar; and driving said at least one pile means downwardly into said sand until it is inserted to desired depth.

18. The method of claim 15 wherein said securing means comprises at least one collar, said placing of said at least one pile means in said sand comprises the steps of:

aligning said at least one pile means with said at least one collar so that said at least one pile means extends upwardly from the surface of said sand through said at least one collar; and digging at least one hole in said sand, said hole being of a sufficient size so that said at least one pile means can be placed therein and will extend above an uppermost surface of said sand;

placing said at least one pile means in said at least one hole; and securing said at least one pile means in said at least one hole.

19. The method of claim 17, wherein said step of placing said erosion prevention means on said surface comprises the steps of lifting said plurality of elements by corresponding lifting pins and transporting said plurality of elements to a predetermined position on said beach.

20. The method of claim 15, further comprising the step of arranging said at least one string on said surface so that said center planes of adjacent ones of said elements are disposed transversely relative to each other and form alternating obtuse and acute angles with respect to said surface.

* * * * *

UNITED STATES PATENT AND TRADEMARK OFFICE
CERTIFICATE OF CORRECTION

PATENT NO. : 5,380,124
DATED : January 10, 1995
INVENTOR(S) : Cacossa et al.

It is certified that error appears in the above-identified patent and that said Letters Patent is hereby corrected as shown below:

Column 1, line 8, "a" should read --of--.

Column 2, line 44, "mender" should read --member--.

Column 3, line 1, "it" should read --It--.

Column 3, line 5, cancel the word "to".

Column 4, line 66, "!by" should read --by--.

Column 10, line 59, after "are subject" insert --to--.

Column 11, line 2, after "preferred embodiments" insert --in--.

Column 11, line 5, after "16 and" insert --in--.

Signed and Sealed this

Second Day of May, 1995

BRUCE LEHMAN

Attest:

Attesting Officer

Commissioner of Patents and Trademarks